(12) United States Patent
Perera et al.

(10) Patent No.: US 8,540,810 B2
(45) Date of Patent: Sep. 24, 2013

(54) REGENERABLE ADSORPTION UNIT

(75) Inventors: Semali Priyanthi Perera, Bath (GB);
Chin-Chih Tai, Kaohsiung Hsien (TW)

(73) Assignee: Nano-Porous Solutions Limited (GB)

( * ) Notice: Subject to any disclaimer, the term of this patent is extended or adjusted under 35 U.S.C. 154(b) by 928 days.

(21) Appl. No.: 12/530,576

(22) PCT Filed: Mar. 14, 2008

(86) PCT No.: PCT/GB2008/000907
§ 371 (c)(1),
(2), (4) Date: Sep. 9, 2009

(87) PCT Pub. No.: WO2008/110820
PCT Pub. Date: Sep. 18, 2008

(65) Prior Publication Data
US 2010/0035751 A1    Feb. 11, 2010

(30) Foreign Application Priority Data
Mar. 14, 2007 (GB) .................................. 0704934.9

(51) Int. Cl.
*B01D 53/04* (2006.01)
*B01J 20/34* (2006.01)

(52) U.S. Cl.
USPC .................................. 96/143; 95/148; 502/56

(58) Field of Classification Search
USPC ............ 204/551; 423/230; 96/143; 95/148; 502/56
IPC .................................. B01J 20/28, 20/00, 20/26
See application file for complete search history.

(56) References Cited

U.S. PATENT DOCUMENTS

2007/0117939 A1* 5/2007 Iaccino et al. .................. 526/90
2008/0119356 A1* 5/2008 Ryu et al. ...................... 502/400

FOREIGN PATENT DOCUMENTS

| DE | 4104513 | 8/1991 |
|----|---------|--------|
| DE | 4104513 A1 * | 8/1991 |
| EP | 0532368 | 3/1993 |
| WO | WO 9312868 A1 * | 7/1993 |
| WO | WO0187461 | 11/2001 |

* cited by examiner

*Primary Examiner* — Wayne Langel
*Assistant Examiner* — Syed Iqbal
(74) *Attorney, Agent, or Firm* — The Belles Group, P.C.

(57) ABSTRACT

An adsorption unit comprising an adsorbent hollow fiber in which the fiber includes an active component and means for transmitting heat.

28 Claims, 15 Drawing Sheets

REGENERABLE ADSORPTION UNIT

The present invention is directed towards the preparation and use of regenerable adsorption units and in particular regenerable hollow fibres and electrically regenerable fibres.

The range of regenerable adsorption units provided by the present invention may be very useful to many process industries. The development of rapid thermal swing, electrically regenerable adsorption units is an important element of the introduction of new energy saving and environmentally friendly technologies all over the world. For example, such technology is applicable for valuable material recovery and recycling, pollution control, gas separation, drying, wastewater treatment and recovery of material from waste gases. There is an increasing need for removal and recovery of noxious species such as carbon dioxide and other volatile organic compounds (VOCs) from gas and/or liquid streams. The adsorbed compound may then be desorbed electrically and optionally be recycled (if appropriate) or removed for downstream processing and safe disposal. The method for removing such compounds must have a low capital and operational cost and a low environmental impact.

The desorption of adsorbates after they have been used to adsorb into the matrix of the fibre the selected components can be achieved in a number of ways (temperature, vacuum and depressurisation) but the most common is by the application of temperature. Current techniques for maintaining the adsorption properties of a unit generally involve the removal of the adsorbent from the unit where the adsorption occurs and heating this to regenerate it. This may be done, for example, in an oven passing a heated gas stream through the adsorbent bed or using planar heaters. This is expensive in both time (generally requires a minimum of 24 hours at the elevated temperature) and capital and operational cost. Having to shut the system down while the adsorbent is removed from the unit for treatment is inefficient. Alternatively, having a twin bed system where one adsorbent bed does the adsorption while the other undergoes regeneration increases the inventories and the unit will be larger and substantially less economical.

External ovens have a high capital and operational cost, uneven temperature distribution in the bed and also take time to heat the adsorbent materials (as well as the surrounding air) to the necessary temperature and to cool down to ambient or operating temperatures again. In some cases, it may not currently be economically viable to regenerate the adsorbent and the used material is simply removed and replaced with a new unit.

There is therefore a need for an efficient and cost effective regenerable adsorption unit.

According to the present invention there is provided an adsorption unit comprising a hollow fibre in which the fibre includes an active component and means for transmitting heat. The active component is selected to be highly sensitive and reactive to the component or components of choice and desorbs the selected component or components at a reasonable temperature and under low or no vacuum or a combination of the two. The active component in the unit will adsorb the selected component or components while the unit is in use. When the activity drops below a pre-determined level or after a predetermined number of cycles, the unit is regenerated. This may be done by the direct application of heat to the active adsorbent in the unit.

Adsorbent hollow fibres may advantageously be used as adsorption units as they have a high surface area to volume ratio for the adsorption to take place on, can be flexible, have a low pressure drop for energy efficiency, have a superior kinetic adoption preference compared to existing units, and have a resistance to adsorption (prevent down stream equivalent and valves blocking). In particular a bundle of adsorbent hollow fibres may be used through which the fluid may pass. The molecules to be separated may be adsorbed onto the walls by Van der Waals forces and/or by molecular sieving.

The adsorbent, for example zeolites (in particular high silica zeolites) with a range of pore sizes can simultaneously operate as a molecular sieve and adsorb the selected component. There is then a carbon mixed active layer which carries the current for heating the fibre. Alternatively, the carbon fibre could act as an adsorbent as well as providing the heating medium although this is less preferred. In another alternative, semi-conducting powder in a layer may act as the heating medium.

The heat may be applied by any suitable means. In one embodiment of the invention, the means for transmitting heat is an electrically conductive component and the heating comprises the application of a voltage between the two ends of the fibre. The passing of an electrical current through the fibre by means of the conductive component results in localised heating which thereby desorbs the active component. The application of the voltage heats the active component more quickly than if they were placed in an oven and the active component cools more quickly than if it had been heated in an oven on the removal of the electric current. The time taken for the desorption is also substantially reduced in comparison to existing techniques as the adsorbent does not have to be removed from the unit, taken to a heat source (e.g. oven), heated for desorption, cooled to operating temperatures again and fitted back into the unit before adsorption can begin again. The regeneration may also be assisted by the counter current passing of an inert gas, for example heated nitrogen, through the bed as a purge.

In another embodiment, the conductive component is a thermally conductive material and the heating of the unit comprises the localised application of a heat source, for example by induction. Again, the localised application of the hear close to the active material ensures that the desorption is conducted more quickly than when using heating in traditional packed beds. The active material is heated up and cooled more quickly than in traditional means.

The hollow fibre may comprise one or more layer. The layers may all have the same composition or they may have different compositions. The conductive material may be in each layer or it may only be in one layer, preferably the outer layer. The hollow fibre must be sufficiently porous for the gaseous material to be adsorbed is able to pass through it such that the adsorbent can react with the selected component or components. Therefore the mean pore size in one or more layers (including the outer layer) may be less than 5 μm. For example, the mean pore size in the one or more layers may be less than 1 μm or less than 500 nm, or less than 100 nm, or less than 10 nm.

The hollow fibre may be organic and comprise a polymer, an additive, an adsorbent material and an electrically conductive material. The polymer may be selected from the group consisting of polysulfone (PSF), polyvinylidenefluoride (PVDF)), polyethylene, polypropylene, poly(phenylene oxide), polyacrylonitrile, polymethylmethacrylate, poly(vinyl chloride), Poly ether sulfone (PESF), Cellulose acetate, Polyamide (aromatic), Polyimide, Poly(ether imide) and poly (vinyl alcohol), co-polymers of Polylactide (PLA) and Polyglycolide (PGA), Polycaprolactone (PCL) and Poly(ethylene terephathalate) (PET) or any polymer that dissolves in the solvents. In preparation, the fibre may have a temperature pre-treatment, for example, at about 200° C., to remove any trapped polymer solvents and moisture and to allow access to the adsorbent particles.

The additive may be present to improve transport properties and may be selected from poly(vinyl alcohol), polyvinyl pyrrolidone (PVP), polyacrylic acid (PAA), calcium chloride and fumed silica.

The adsorbent may be a zeolite, for example a high silica zeolite such as silicalite and ZSM5, or other molecular sieve materials such as MCM41, MCM48, silica adsorbents or activated carbon powders, or ion exchange resins.

The hollow fibre may be inorganic and comprise an inorganic powder, a binder, an adsorptive component or reactive component and an electrically conductive component. The inorganic powder may be selected from the group consisting of ceramics, adsorbents and ion exchange resins. The ceramic may be selected from the group consisting of aluminium oxide, bentonite, silica, hydroxyapatite or mixtures thereof. The binder may be selected from lead bisilicate frit, fine standard borax frit, bentonite and Hyplas. The inorganic fibres are produced by using a polymer, a binder and an adsorptive or reactive component such as a zeolite or ion exchange resin. The fibre is fired to burn the polymer and to partially melt the binder to hold the adsorbent or reactive particles in the structure. The firing temperature should be below the melting temperature of the adsorbent to avoid any loss of activity, for example at less than 700° C.

The electrically conductive component may be selected from the group consisting of silver, metal powder (e.g. copper), carbon, conducting polymers, conducting cement, semiconductor materials and combinations thereof. For example, the conducting layer may comprise one or more of polyaniline, carbon black, activated charcoal, copper powder, polyaniline composite with 10-30% (for example 15-25% or 20%) carbon black and silver conductive paste.

The inorganic adsorbent fibre may have a flexibility of greater than 5° bending angle from the mid point of the fibre, preferably greater than 10°, 20° or 30°. The bending angle of fibres produced according to the present invention was measured by taking a 20 cm length of the inorganic fibre, mounting this on two rods, one at each end, and one of the rods was moved downwards at a speed of 2 cm/min until the fibre snapped. The angle of flex (bending angle) was then measured between the mid point of the fibre in the horizontal position to the end point where the fibre snapped.

The inorganic adsorbent hollow fibre may have a mechanical strength (load) of greater than 200 g force at a crosshead speed of 1.0 mm/min for a sample which has an effective surface porosity of 1000-3000 ($\epsilon/q^2$ calculated from Knudsen flow method). Optionally the load at breaking point is greater than 250 g force or greater than 300 g force. A preferred range is 250-800 g, more preferably is 300-700 g force and most preferred 400-650 g. Increased mechanical strength may be obtained by producing multiple layer fibres. Particularly preferred are double or triple or quadruple layer fibres. Double layer fibres are stronger than single layer fibres and triple layer fibres are mechanically substantially stronger than double layer fibres.

A further advantage to the production of double or triple or quadruple layer fibres (in addition to the substantially increased mechanical strength) is that the fibres are largely defect free. With two or three layers of the same composition, any defects in one layer are extremely unlikely to be mirrored by a similar defect in the next layer. The net effect is that there are no pin holes in the fibre produced and it can therefore be used as an efficient porous layer or membrane. This benefit is present for both inorganic adsorbent fibres and for adsorbent polymeric fibres. It is also possible to produce fibres with a graded pore structure which may improve the filtration properties.

Further, it is possible to have different compositions in the two or more layers. It is therefore possible to produce a fibre where each layer is tailored towards a particular property. For example, the inner layer may be of a composition to provide a particular strength to the fibre, but the outer layer may be constructed to provide the necessary heat transfer means to enable the adsorbent to be desorbed. Other layers may have properties to adsorb different components or have a particularly small pore size for sieving or filtration purposes etc. Each layer could be constructed from powders which are electrically conducting. This allows the manufacture of a low resistance fibre with low resistance in each layer and consequently a low voltage requirement for heating.

The porous hollow fibre optionally has a surface area to volume ratio greater than 1,000 $m^2/m^3$. The area to volume ratio may be in the range 1,000-10,000 $m^2/m^3$, preferably 1,000-6,000 $m^2/m^3$, and most preferably 2,000-4,000 $m^2/m^3$.

The adsorbent hollow fibre optionally includes a high percentage of adsorbent material. According to one embodiment, there is at least 65% adsorbent material, preferably at least 75% and more preferably at least 80% or 90%. The adsorbent material may be a silicalite, preferably a zeolite and more preferably a high silica zeolite, silica, carbon or ion exchange resin. Including a zeolite in the composition restricts the operating temperature range for the drying and firing (if present) processes. Zeolites lose their functionality if subjected to temperatures of greater than approximately 700-750° C.

The outer diameter of the fibres produced can be 400 μm-2.5 cm depending on the diameter of the spinneret used to produce the fibres and the number of layers used. Therefore, lightweight and compact adsorption units or membranes can be made using a single hollow fibre or a cluster of narrower adsorbent fibres as appropriate. The hollow fibres are nanoporous or microporous and can be tailored to exhibit significant adsorption capacity, gas fluxes, bending strength (flexibility) and bursting pressure (7-15 bar). The properties of the fibre can be tailored to individual situations.

Flexible hollow fibres are much more resistant to stresses caused during installation, operation and service, and because they can be much smaller in diameter and thus the surface area to volume ratio is much larger, bundles of such fibres can process a great deal more gas/liquid than existing tubular membranes or adsorption units (and thus are far more economical).

If different compositions are used for the different layers, then it may be possible to have a selective porous layer which can absorb different compounds at different rates. It is also possible to have one layer present for one property (for example, increased strength) and another layer for another property (for example, selectivity towards a particular molecule or compound).

The invention may be put into practice in a number of ways and a number of embodiments are shown here by way of example with reference to the following figures, in which.

Figure 5:
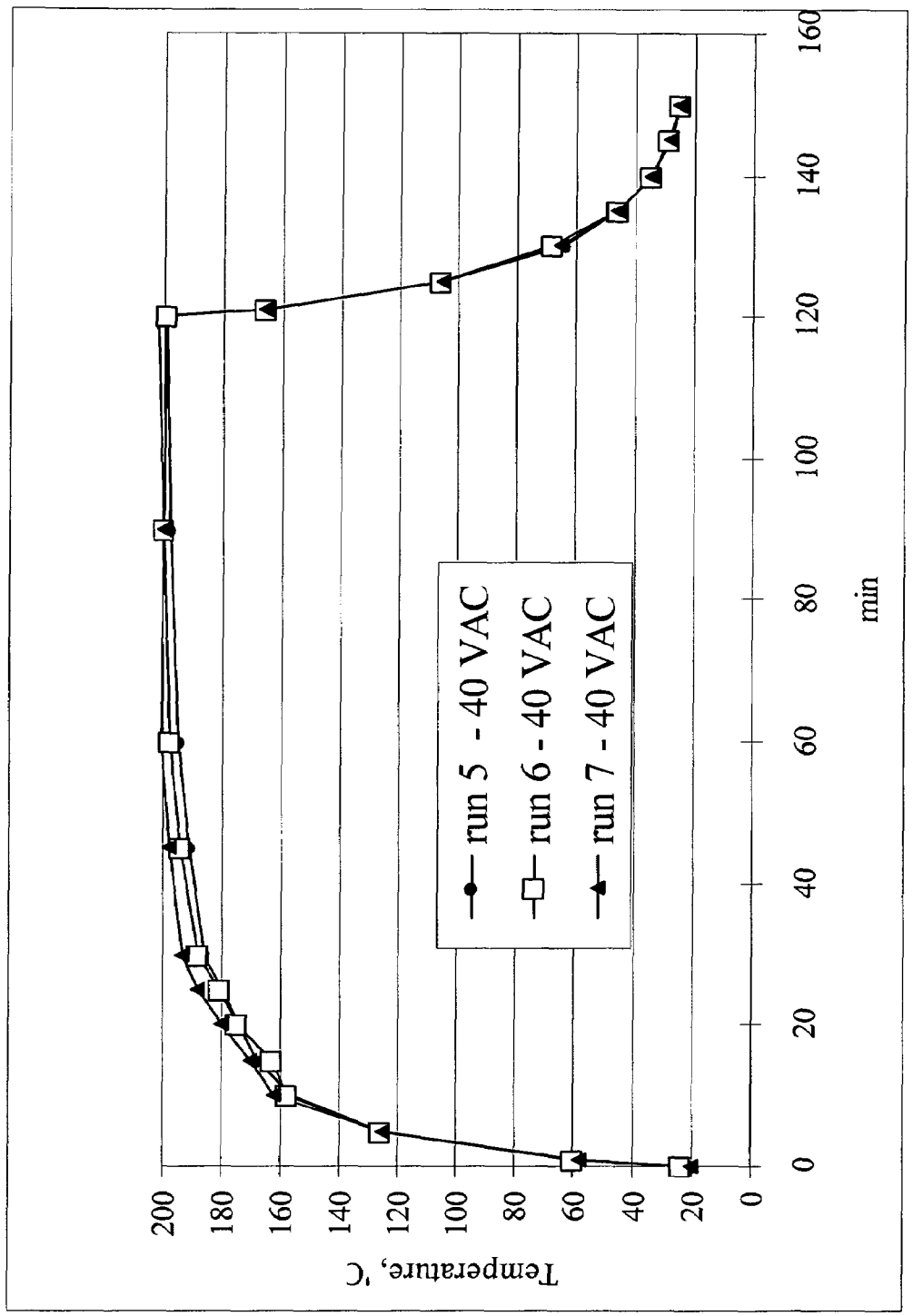
Figure 6:
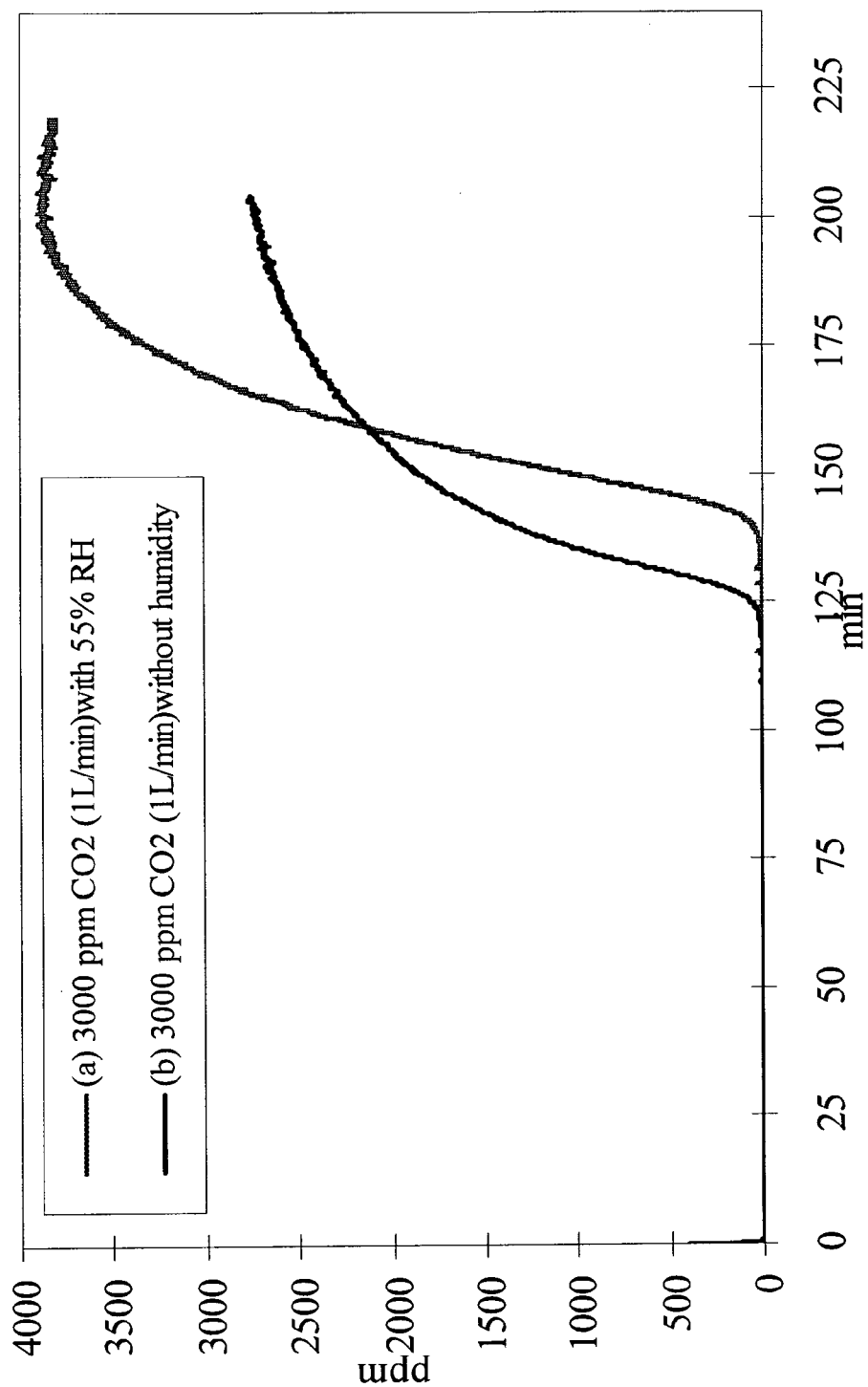
Figure 7:
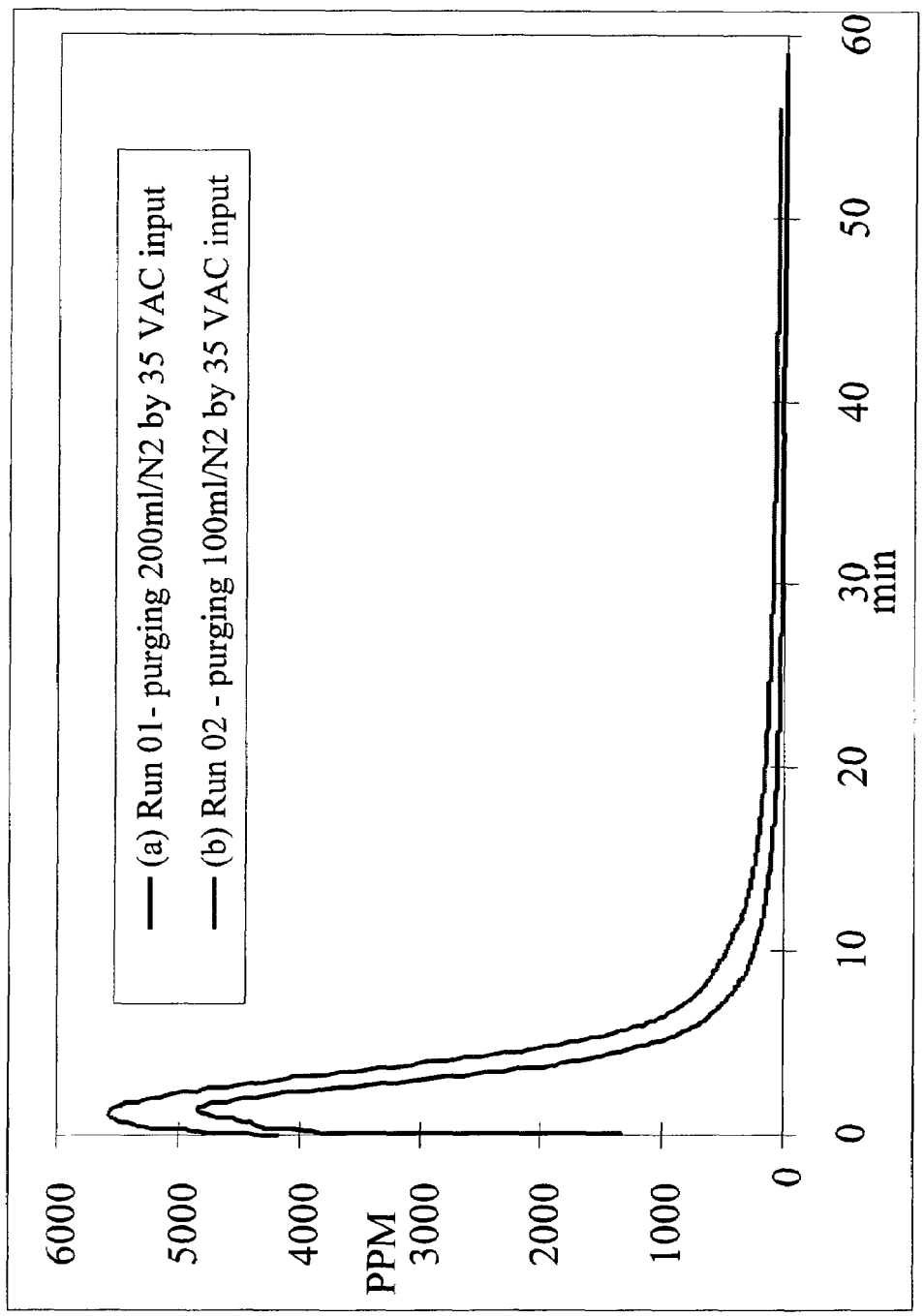
Figure 8:
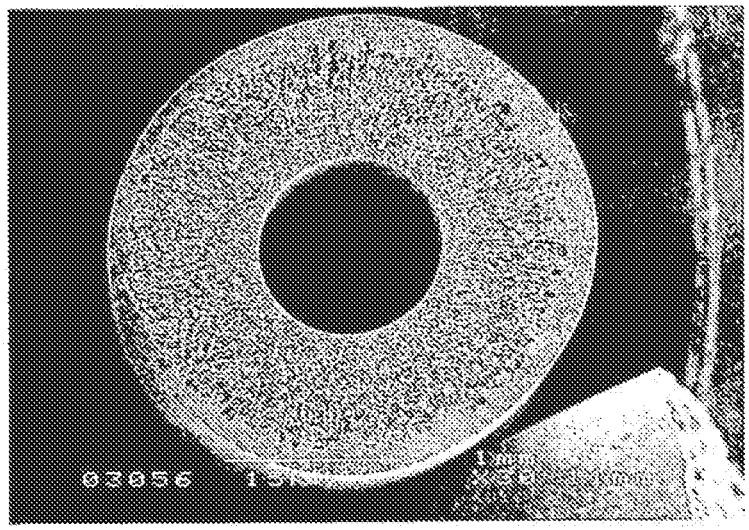
Figure 9A:
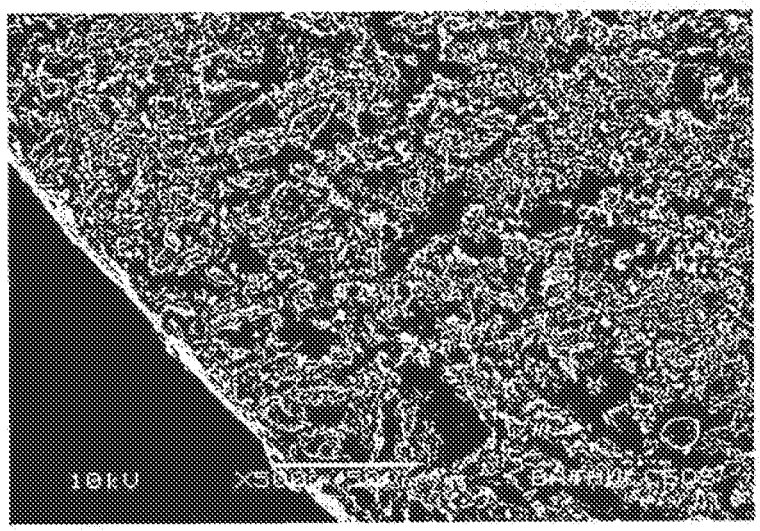
Figure 9B:
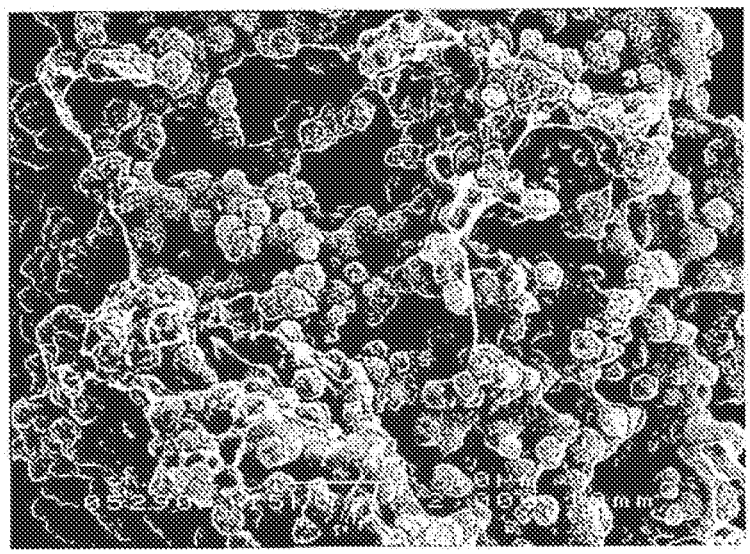
Figure 10A:
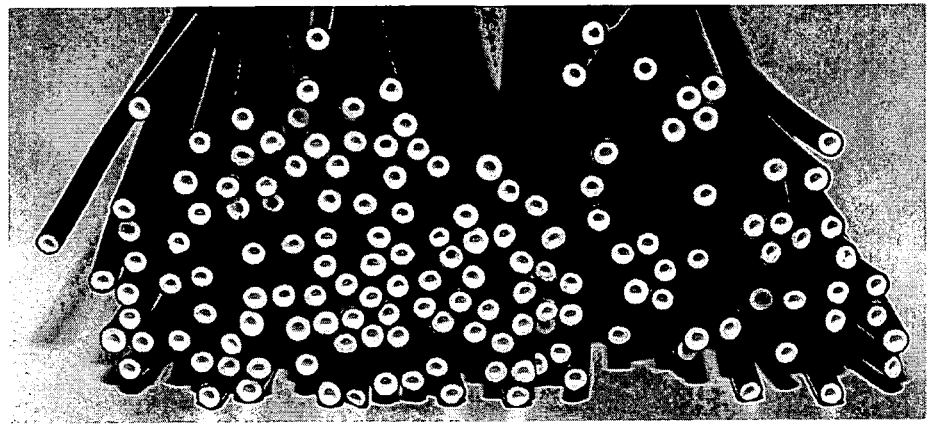
Figure 10B:
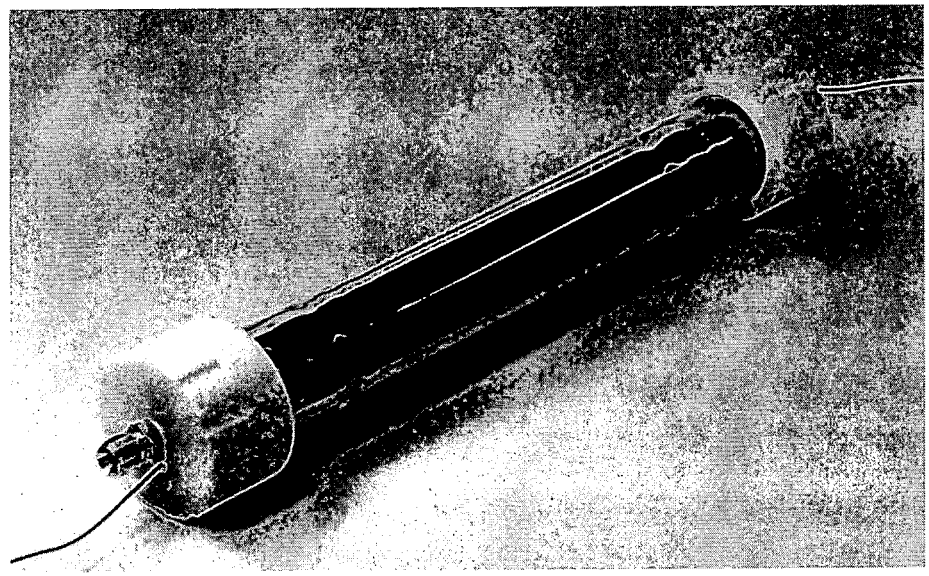
Figure 11:
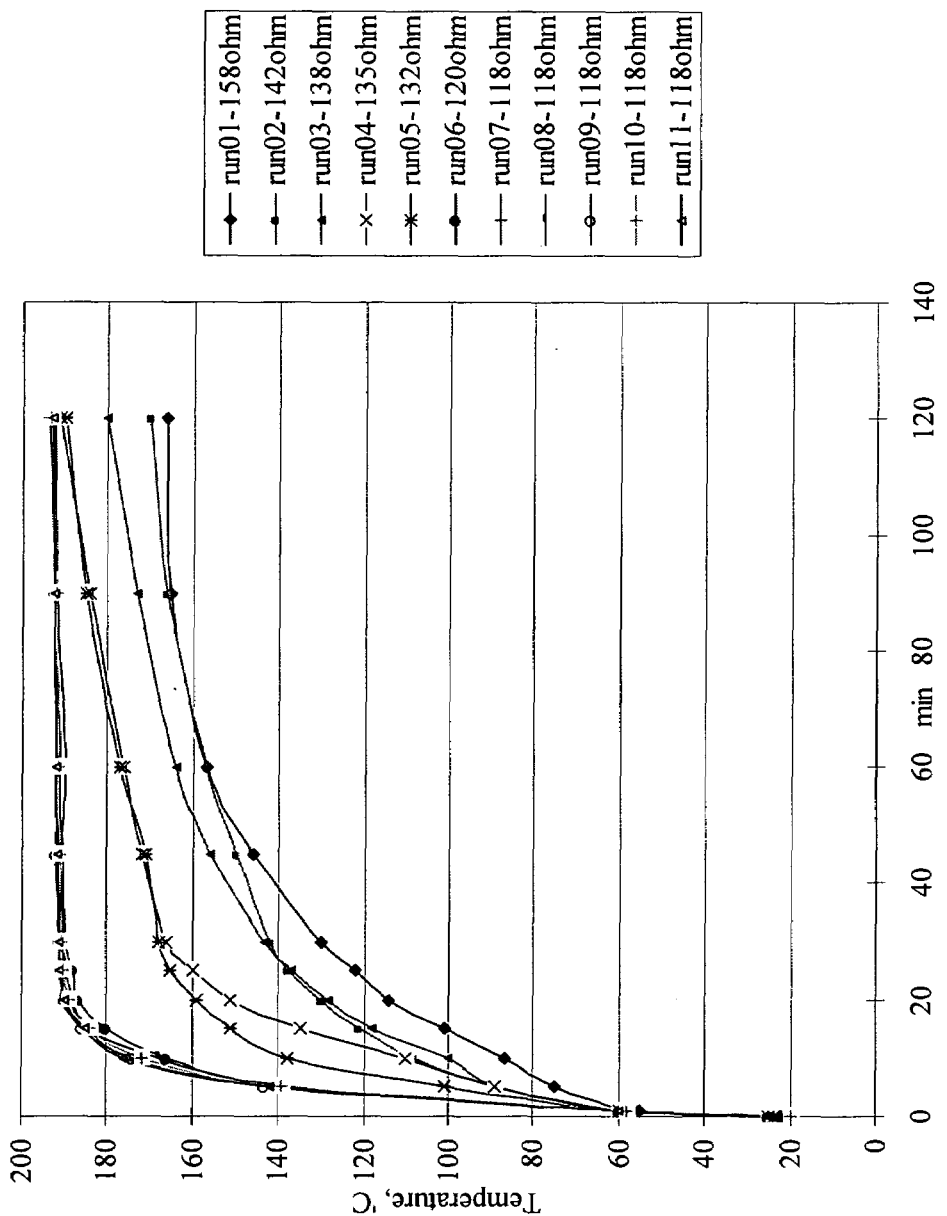
Figure 12:
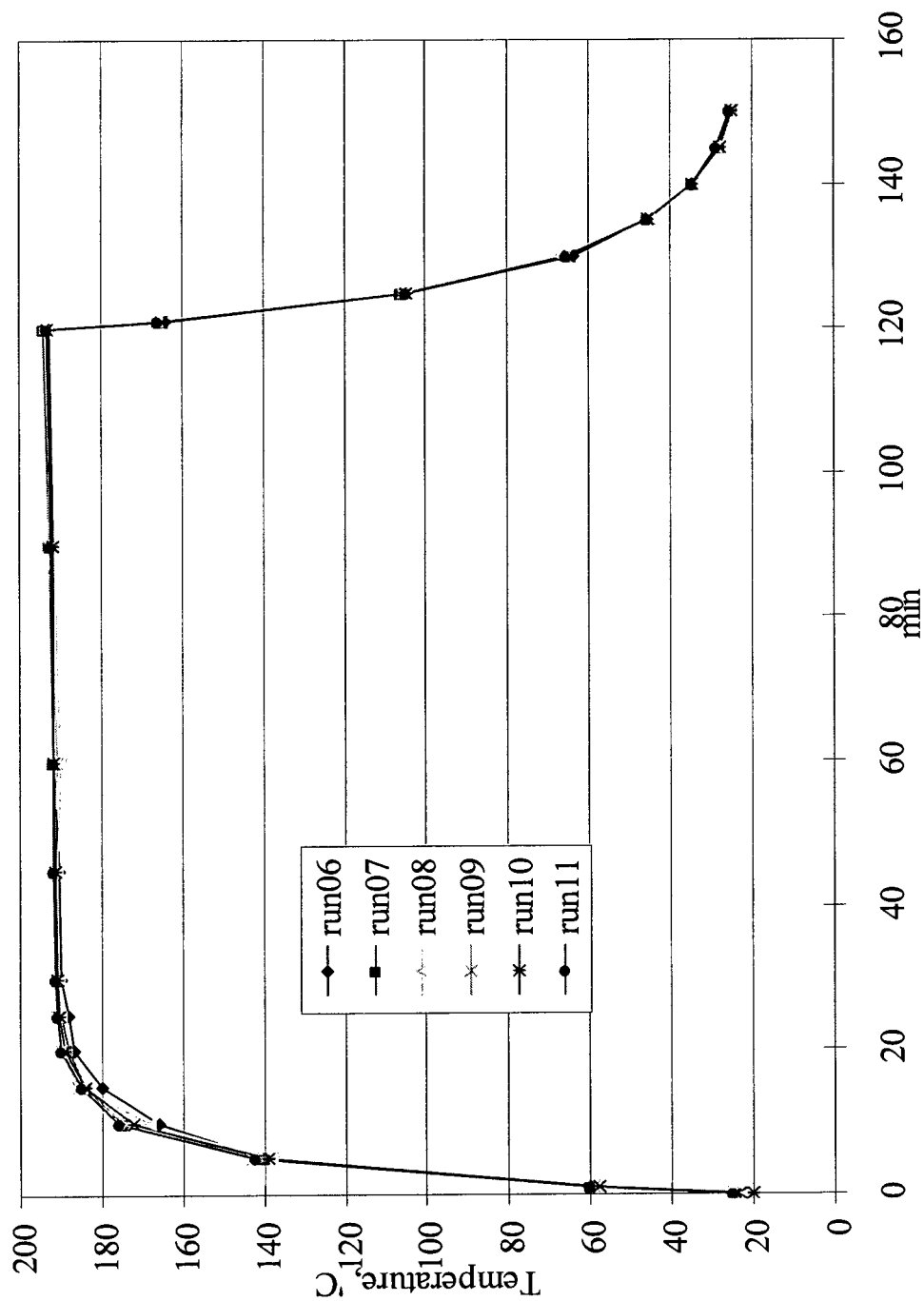
Figure 13:
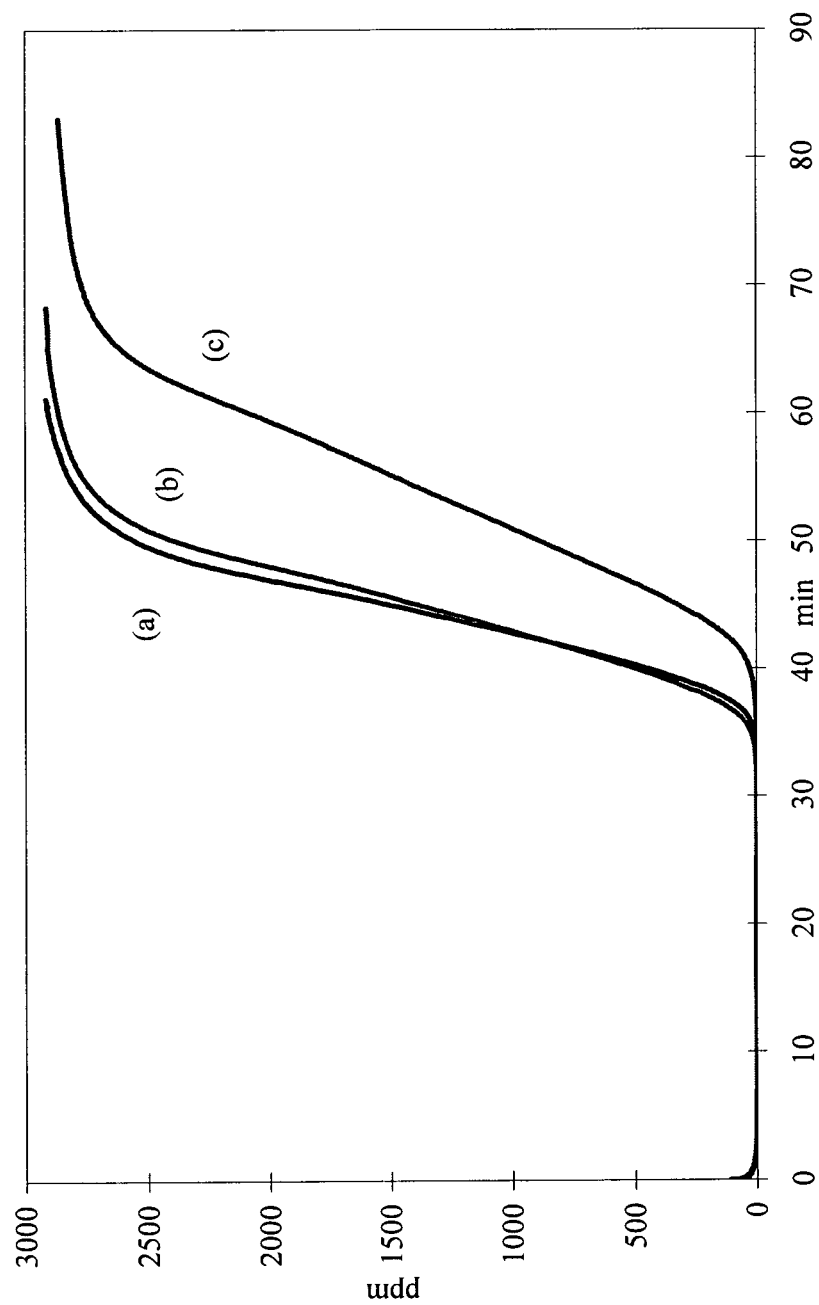
Figure 14:
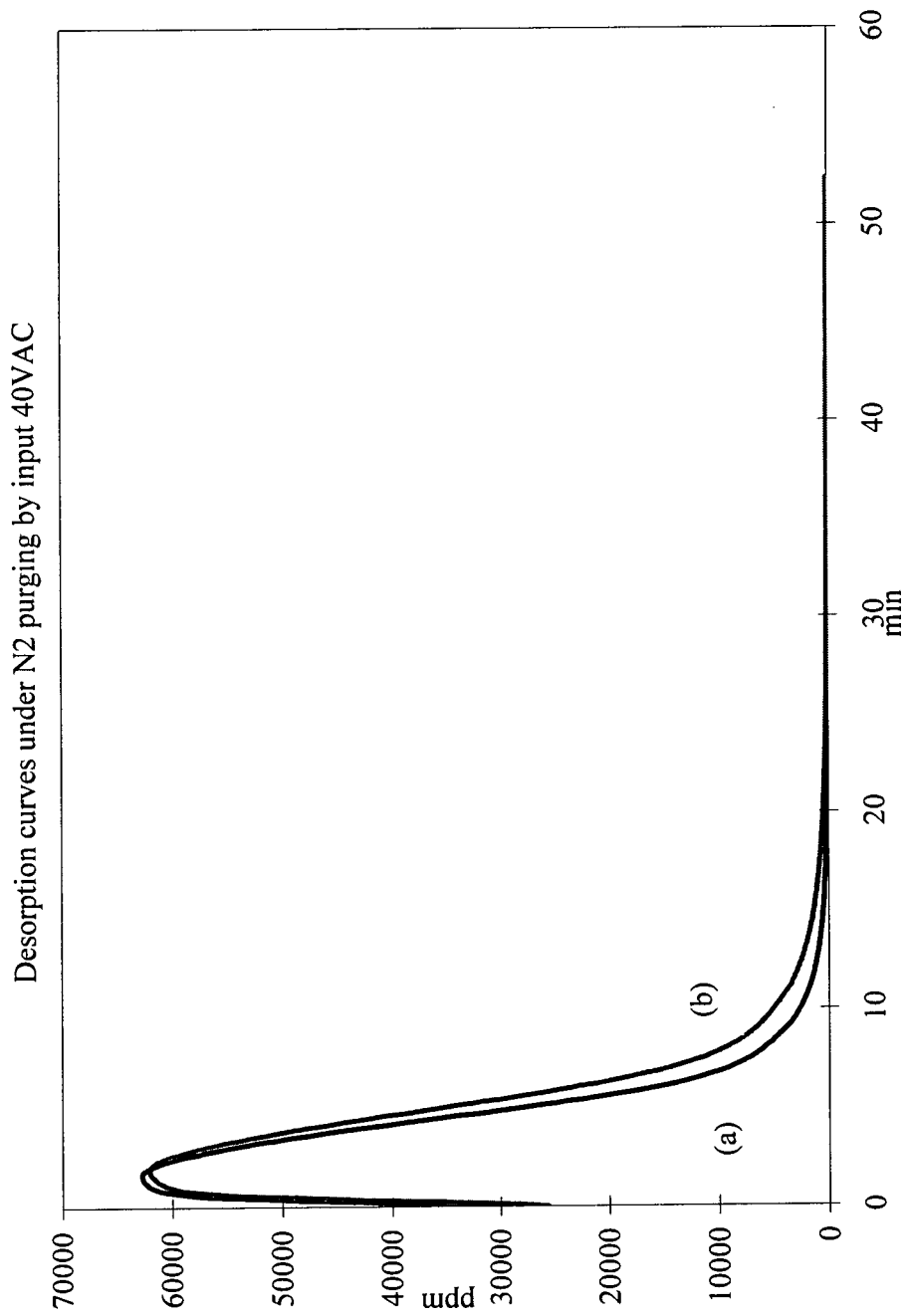
Figure 15:
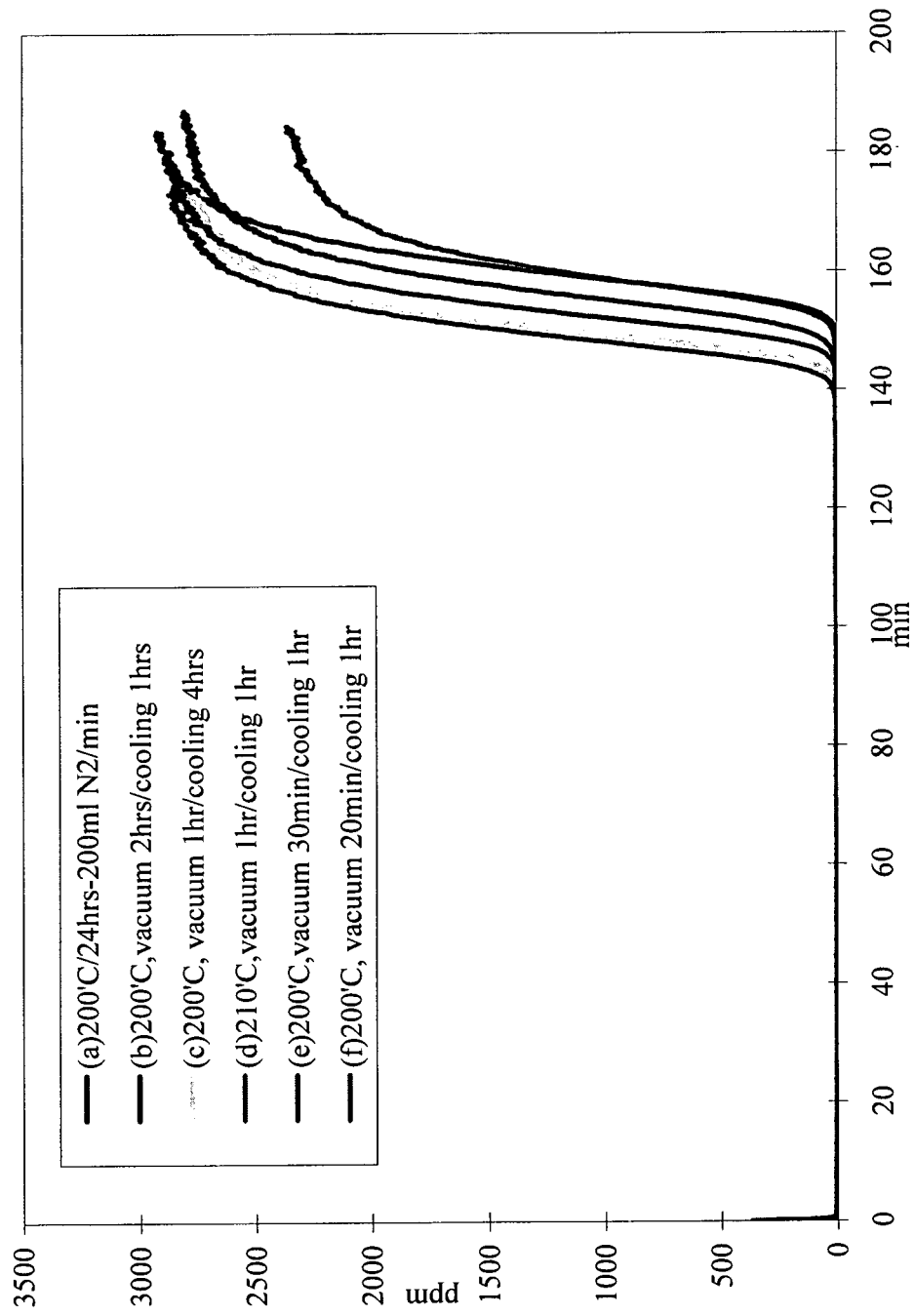
Figure 16:
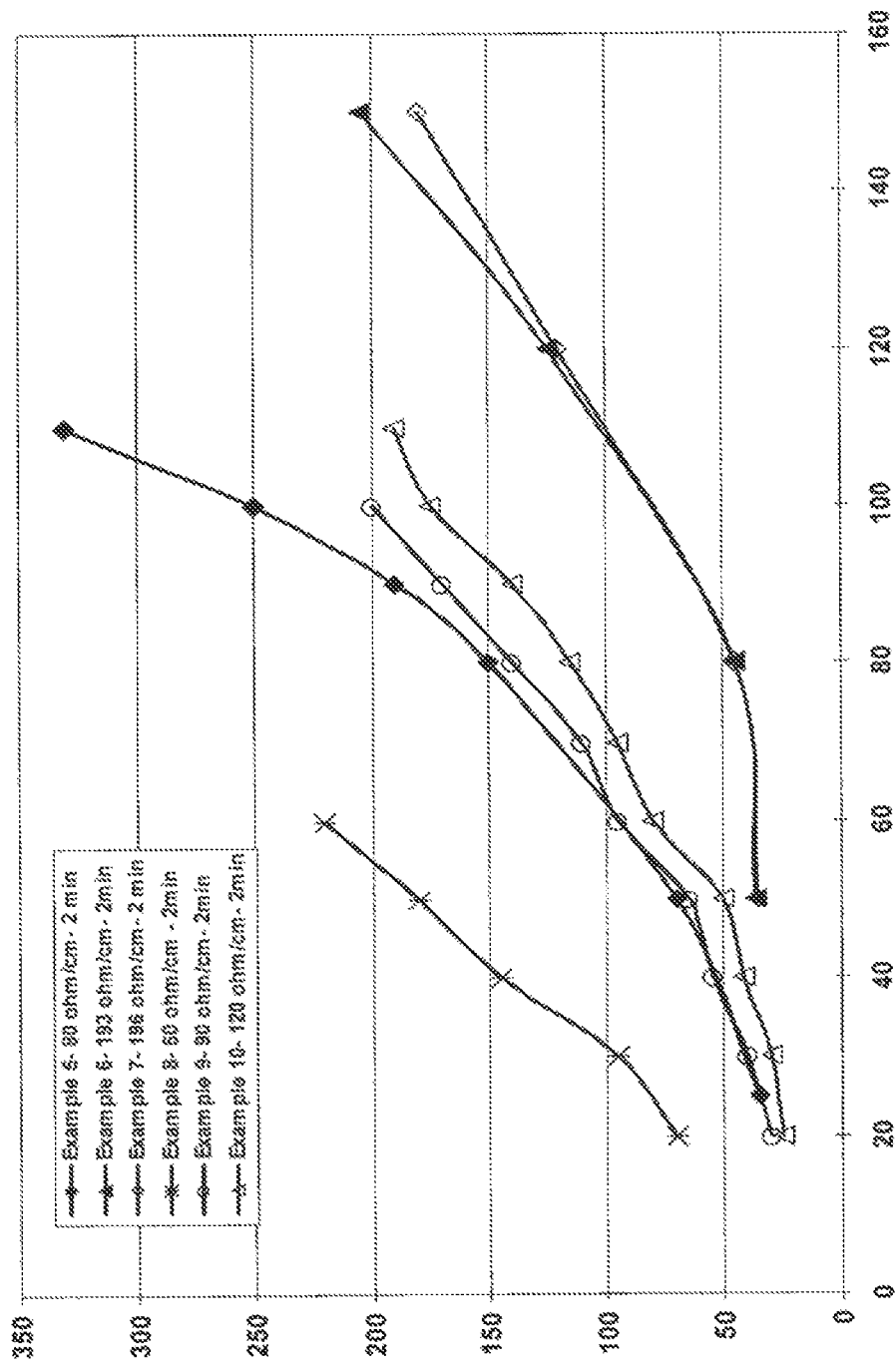

FIG. 5 shows the heating and cooling cycle of triple layer fibres;
FIG. 6 shows the adsorption performance of the triple layer fibres;
FIG. 7 shows the desorption performance of the triple layer fibres;
FIG. 8 shows a double layer fibre according to the present invention;
FIGS. 9a and 9b show SEMs of the individual layers of the double layer fibre shown in FIG. 8;
FIGS. 10a and 10b show an arrangement of a bundle of double layer fibres;
FIG. 11 shows the heating curve of a double layer fibre as it reaches steady state;
FIG. 12 shows the steady state heating and cooling cycles of the double layer fibres;
FIG. 13 shows the adsorption performance of the double layer fibres;
FIG. 14 shows the desorption performance of the double layer fibres;
FIG. 15 shows the adsorption performance of a double layer fibre; and
FIG. 16 shows the temperature profiles of double layer fibres for examples 5 to 10 for a range of applied voltages.

TRIPLE LAYER FIBRES

A polymeric three layer conductive adsorbent hollow fibre was produced in accordance with the details below and tested.
Materials
Adsorbents used to demonstrate and exemplify the invention:
4A zeolites (particle size 5 μm)
13X zeolites (particle size used 5 μm).
Main polymer for the examples:
Polyethersulfone (PESF) (from Ameco Performance, USA) with a glass transition temperature (Tg) of up to 230° C.-250° C. was used as a common polymer in all the spinning dopes.
Materials for outer conducting layer:
Polyaniline (emeraldine base, MW. 65,000), (Aldrich, UK), conductive polymer with the Tg up to 300° C.
Carbon black (metal basic, fine powder) (Alfa Aesar, UK).
Activated charcoal (<40 micrometer) (Fluka, UK).
Copper powder (metal basic, <10 μm) (Alfa Aesar, UK).
Polyaniline (emeraldine salt), composite 20 wt % on carbon black (Aldrich, UK).
Silver conducting adhesive paste (Alfa Aesar, UK).
Semiconductor materials
Preparation of Spinning Dopes: First Layer Dope and Second Layer Dope
The required quantity of organic solvent (NMP) was poured into a 250 ml wide-neck bottle and then the desired quantity of polymer (PESF) was slowly added. The mixture was stirred on a rotary pump to form the polymer solution. After the clear polymer solution was formed, a required amount of adsorbent (4A and 13X) was added into the polymer solution slowly. The mixture was stirred by an IKA® WERKE stirrer at a speed between 500-1000 rpm for 2-4 days to ensure that the adsorbent powder was dispersed uniformly in the polymer solution. Finally, the mixture was put back on a roller to degas and form the uniform spinning dope.
The spinning dope of conductive layer was prepared from required quantity of NMP and the desired quantity of conductive polymer (polyaniline). The mixture was filtered through a 100 μm Nylon filter in order to remove the non-dissolved polyaniline. The desired quantity of second polymer (PESF) was then added into solution. The mixture was put on the roller to form the polymer solution. After the clear polymer solution was formed, the required amounts of finely divided conductive powder (for example, active carbon, carbon black and copper powder) were slowly added to the polymer solution.

Detailed procedure for the preparation of the first spinning dope which forms a first (inside) layer in the fibre:
1. Weighed 100 gram of NMP, and poured it into a 250 ml wide-neck bottle.
2. Weighed 20 gram of PESF, and then added it slowly to the solvent.
3. Put the mixture on a rotary pump to form the polymer solution. Allow 2-3 days to dissolve the PESF.
4. After the clear polymer solution was formed, the bottle was reset in an IKA® WERKE stirrer at a speed between 500-1000 rpm.
5. Weighed 80 gram of 13X adsorbent, and then added it slowly into the polymer solution. Allow 1-2 days to ensure that the adsorbent powder dispersed uniformly in the polymer solution.
6. The mixture was put back on a rotary pump to degas and form the uniformly spinning dope. Allow 4-7 days in order to form a uniform spinning dope.

Detailed procedure for the preparation of second spinning dope which forms a second (intermediate) layer in the fibre:
1. Weighed 80 gram of NMP, and poured it into a 250 ml wide-neck bottle.
2. Weighed 20 gram of PESF, and then added it slowly to the solvent.
3. Put the mixture on a rotary pump to form the polymer solution. Allow 2-3 days to dissolve the PESF.
4. After the clear polymer solution was formed, the bottle was reset in an IKA® WERKE stirrer at a speed between 500-1000 rpm.
5. Weighed 80 gram of 4A adsorbent, and then added it slowly into the polymer solution. Allow 1-2 days to ensure that the adsorbent powder dispersed uniformly in the polymer solution.
6. The mixture was put back on a rotary pump to degas and form the uniformly spinning dope. Allow 4-7 days in order to form a uniform spinning dope.

Detailed procedure for preparation of conducting spinning dope (outer layer) of the fibre:
1. Weighed 160 gram of NMP, and poured it into a 250 ml wide-neck bottle.
2. Weighed 1 gram of polyaniline, and then added it slowly to the solvent.
3. Put the mixture on a rotary pump to form the polymer solution. Allow 1 day to dissolve the polyaniline.
4. The mixture was filtered through the 100 μm Nylon filter-paper in order to remove the non-dissolved polyaniline.
5. Weighed 39 gram of PESF, and then added it slowly to the solvent.
6. Put the mixture on a rotary pump to form the polymer solution. Allow 2-3 days to dissolve the PESF.
7. After the clear polymer solution was formed, the bottle was reset in an IKA® WERKE stirrer at a speed between 500-1000 rpm.
8. Weigh 10 gram of carbon black, and then add it slowly into the polymer solution. Allow 1 day to ensure that the carbon powder dispersed uniformly in the polymer solution.
9. Weigh 10 gram of active carbon, and then add it slowly into the polymer solution. Allow 1 day to ensure that the carbon powder dispersed uniformly in the polymer solution.

10. Weigh 10 gram of copper, and then add it slowly into the polymer solution. Allow 1 day to ensure that the carbon powder dispersed uniformly in the polymer solution.
11. The mixture was put back on a rotary pump to degas and form the uniformly spinning dope. Allow 4-7 days in order to form a uniform spinning dope.

The tables below gives spinning conditions for use in the spinnerette for the preparation of the triple layer hollow fibre using the three spinning dopes described above. The table also summarises the precursor mixtures compositions of three layer fibres

TABLE 1

| Sample name | Polymer/Solvent Wt % | Polymer/additives Wt % | Pressure Supply | Parameter | Resistance $\Omega$/(25 cm × 100-300 fibres) |
|---|---|---|---|---|---|
| Ex. 1 Internal-layer | PESF/NMP 16/84 | PESF/13X 19/81 | 2 bar | Boreliquid: 4 ml/min Air gap: 5 cm Roller mixture: 25 rpm Water bath: 25° C. | 90-15 |
| Ex. 1 Medium-layer | PESF/NMP 20/80 | PESF/4A 20/80 | 1.5 bar | | |
| Ex. 1 External-layer | Polyaniline + PESF/NMP 0.5 + 19.5/80 | Polyaniline + PESF/carbon black + active carbon + copper 1.4 + 55.7/14.2 + 14.2 + 14.2 | 1 bar | | |

TABLE 2

| Sample name | Polymer/Solvent Wt % | Polymer/additives Wt % | Pressure supply | Parameter | Resistance $\Omega$/(25 cm × 100-300 fibres) |
|---|---|---|---|---|---|
| Ex. 2 Internal-layer | PESF/NMP 20/80 | PESF/13X 23.8/72.2 | 2 bar | Bore liquid: 4 ml/min Air gap: 5 cm Roller: 25 rpm Water bath: 25° C. | 100-25 |
| Ex. 2 Medium-layer | PESF/NMP 20/80 | PESF/4A 29.1/71.9 | 1.5 bar | | |
| Ex. 2 External-layer | Polyaniline + PESF/NMP 0.4 + 19.6/80 | PESF/activated charcoal + carbon black + copper 38/19 + 14.5 + 28.5 | 1 bar | | |

Spinning Multi-Layer Conducting Adsorbent Hollow Fibres

The mixtures were transferred to three stainless steel vessels and degassed by vacuum pump for 1 hour at room temperature before the spinning process. This step was to ensure that the gas bubbles were completely removed from the viscous polymer solution. The tank for internal dope was pressurised to 2-3 bar using nitrogen during the spinning process. The vessel for second layer dope was pressurized to 1.5-2 bar using nitrogen during the spinning process. The external layer vessel was pressurized to 0.5-1.5 bar (keep this pressure below 2nd layer).

A quadruple orifice spinneret with external layer ($d_{out}/d_{in}$, 4 mm/3.2 mm), second layer ($d_{out}/d_{in}$, 2.95 mm/2.25 mm) internal layer ($d_{out}/d_{in}$, 2 mm/1.1 mm), and the bore diameter 0.8 mm was used to obtain hollow fibre precursors. The air gap was kept at 5-10 cm and water was used as the internal and external coagulator for all spinning runs. Finally, in forming the hollow fibre the precursor was passed through a water bath to complete the solidification process. The hollow fibre was then washed thoroughly in a second water bath. It is very important to ensure that the hollow fibre is not subjected to mechanical dragging throughout the spinning process. Care was taken to ensure continuity of the pressure and internal water support in order to avoid entrapment of air and separation of the fibre, which would eventually result in an unsuccessful spinning.

The hollow fibre precursors were left to soak for 3-4 days in fresh water; this is being very important to ensure the removal of any residual solvent. After the soaking process, the hollow fibre precursors were dried at ambient conditions for seven days before firing and characterization of the inorganic hollow fibre.

Figure 1A:
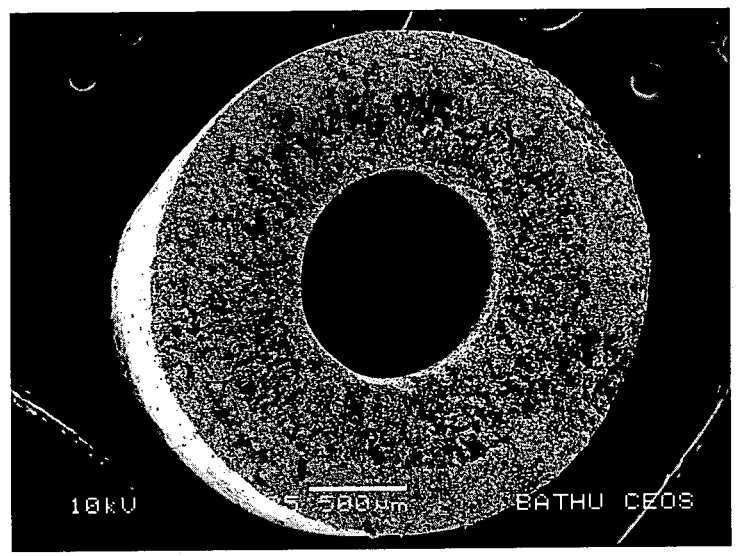
FIGS. 1a and 1b show triple layer fibres according to the present invention.
Figure 1B:
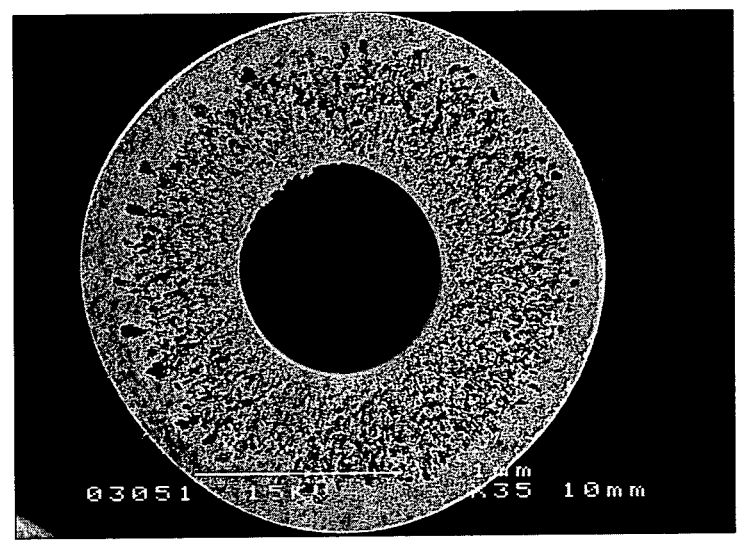

FIGS. 1a and 1b show the triple layer fibre formed with the SEMs taken at different voltages. The inner (core) layer contains 13X as the active ingredient to primarily adsorb $CO_2$ from a gas stream. The intermediate layer contains 4A as the active ingredient and is present primarily to remove moisture from the gas stream. The outer layer is the conducting layer to pass the current through the fibre and provide localised heating of the two adsorbents in the inner and intermediate layers and thereby to desorb the materials.

Figure 2A:
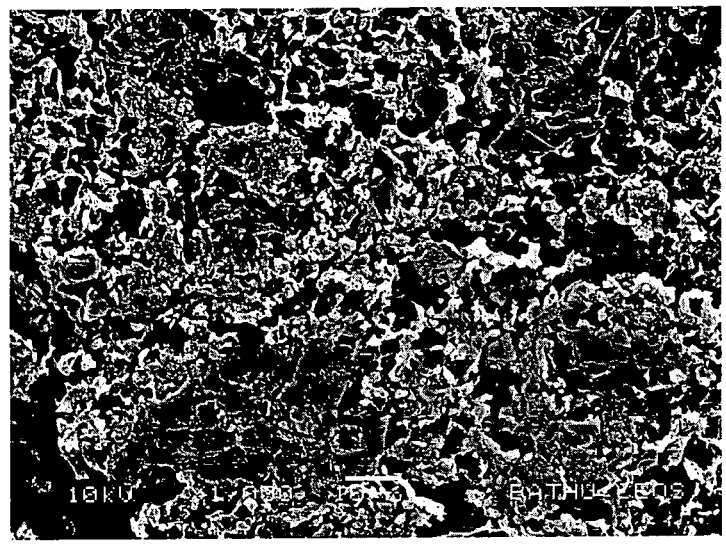
FIGS. 2a, 2b and 2c show SEMs of the individual layers of the triple layer fibre shown in FIG. 1.
Figure 2B:
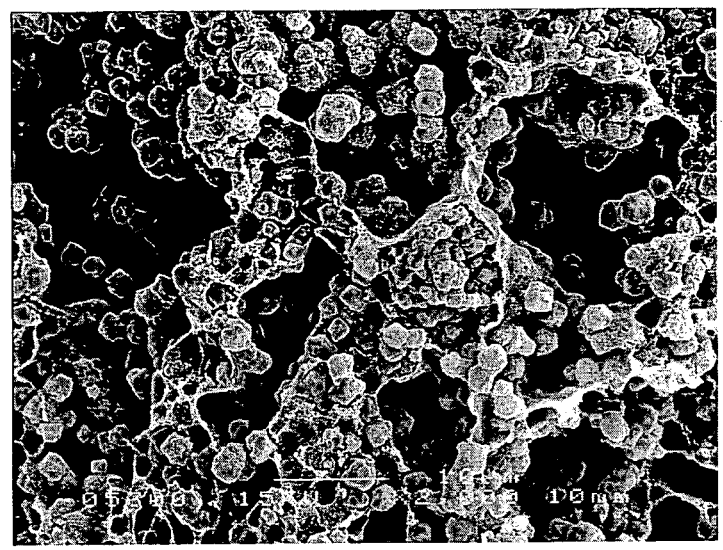
Figure 2C:
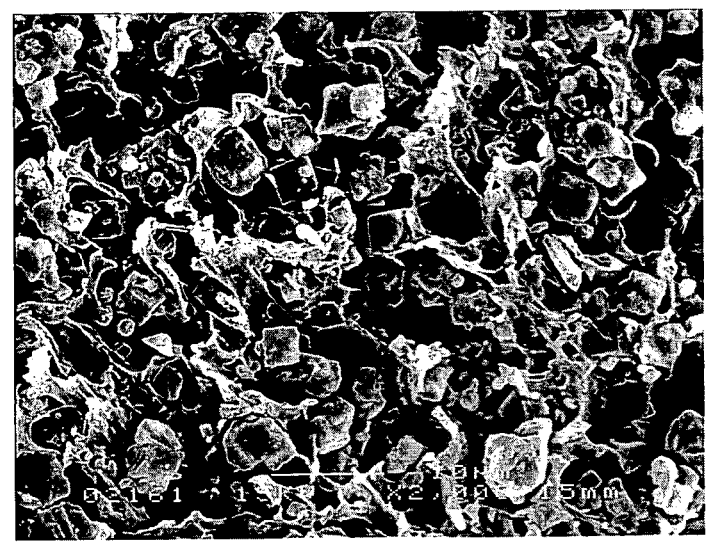

FIGS. 2a, 2b and 2c show each of the three layers at much higher magnification to show in more detail the structure of each layer. FIG. 2a shows the outer conducting layer which is dominated by the carbon and other conducting components. This has a dense structure to enable the current to pass through the fibre but must still have sufficient porosity to allow the gases to pass through to the active intermediate and inner layers. FIG. 2b shows the intermediate layer which includes the 4A zeolite and FIG. 2c shows the inner layer including the 13X zeolite.

Figure 3C:
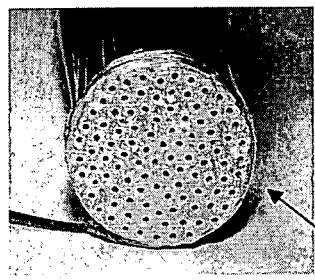
FIGS. 3a, 3b and 3c show an arrangement of a bundle of triple layer fibres.
Figure 3B:
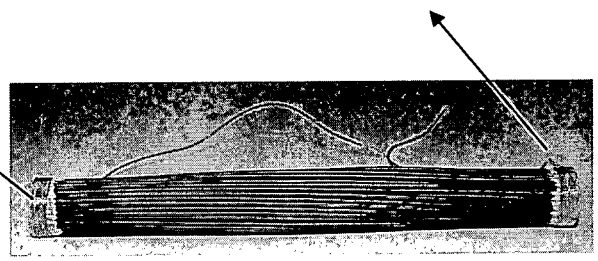
Figure 3A:
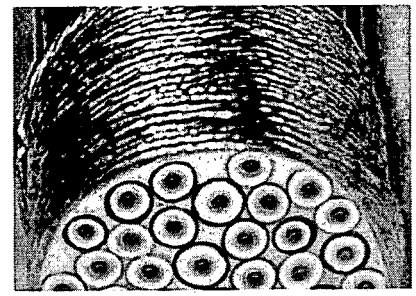

In one embodiment, a bundle of fibres may be grouped together as shown, for example, in FIG. 3. In this case, the end of the bundle of fibres may be coated with an electrically conductive paste such as silver. This is shown more clearly in FIGS. 3b and 3c. This simplifies the electrical supply to the fibre by ensuring that it is not necessary to have separate supplies to each fibre but a single connection at each end. It is not essential to have an end cap of silver or carbon and the current could alternatively be supplied to the fibre by means of a wire wrapped round the perimeter of the bundle of fibres which would then be conducted by the conductor (carbon, carbon composite or semi-conductor material) in the outer layer.

Figure 4:
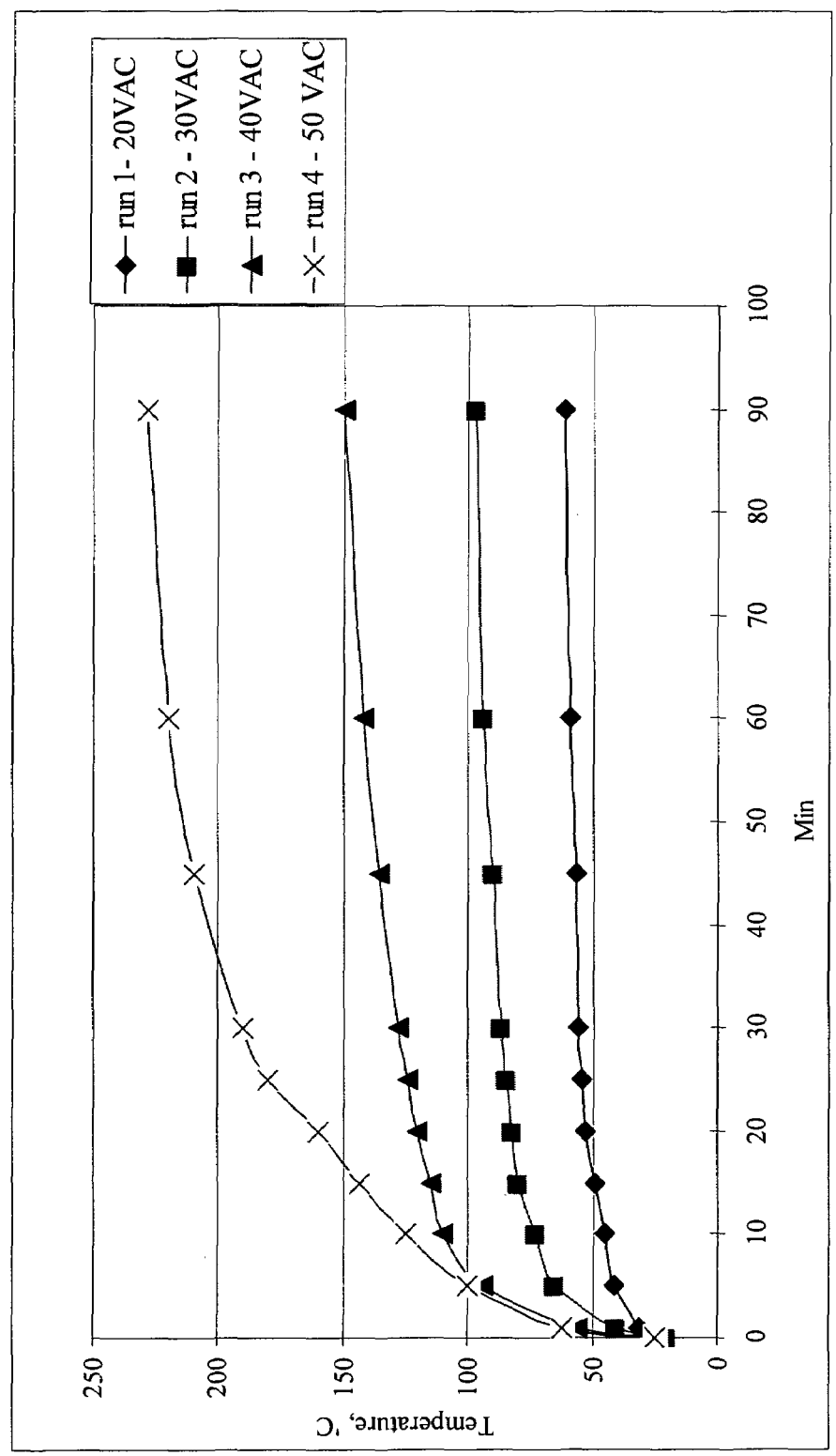
FIG. 4 shows the response of triple layer fibres to different voltage inputs.

FIG. 4 shows the heating performance of a triple layer fibre (composition as set out in table 2 above) with different power inputs ranging from 20V AC to 50V AC. These results show the fibre heating while the fibre is reaching steady state or optimisation. It has been found that the fibres typically reach a steady state and optimised performance after approximately 10 heating and cooling cycles. Referring to FIG. 4, as would be expected the higher the applied voltage, the higher the temperature reached. The heating rates of all four experiments is high and operating temperatures may be reached quickly. Some zeolites may desorb the adsorbed gases at temperatures as low as 60-80° C. but typically the temperature should be above 90° C. for desorption. As can clearly be seen from FIG. 4, at the application of both 40V and 50V, the temperature of the fibre exceeds 90° C. substantially within 10 minutes.

FIG. 5 shows the heating and cooling performance of a bundle of 100 fibres (composition from table 2 above). The applied voltage in each case is 40V AC and the resistance of the bundle is 100Ω. The net effect is a voltage range of 10 to 20V. As will be seen from the close concordance of the three sets of results, the fibres had substantially reached their steady state. Again, the fibres heat up to above 90° C. very quickly (less than 5 minutes) and on the removal of the applied voltage at 120 minutes the temperature drops back to close to ambient temperatures in about 10 minutes. These heating and cooling curves are substantially steeper than would be achieved for fibres using the heating techniques of the prior art (oven or flat plates).

FIG. 6 shows the adsorption performance of fibres (composition as set out in table 1 above) once they have reached the equilibrium state. At 0 minutes the test gas starts passing through the fibres. For curve (a) the test gas comprises 3000 ppm $CO_2$ at 1 liter/min with 55% relative humidity. For curve (b) the gas is similar but without the humidity. The fibres had been regenerated at 180° C. by application of 35V AC. The $CO_2$ is completely adsorbed by the fibres for just about 2 hours from the start of the gas flow. After this time, adsorption efficiency decreases and $CO_2$ starts to appear in the exit gas. This is called the breakthrough point and is a first indication that the fibres need to be regenerated.

For the wet gas, the first appearance of $CO_2$ in the exit gas takes places at about 140 minutes and there is then a very rapid increase in the concentration of the $CO_2$ in the exit gas peaking at just under 4000 ppm after just under 1 hour. The slope of the breakthrough curve is an indication of the efficiency of mass transfer within the system, a sharper curve indicates a more efficient system with lower resistance to adsorption and subsequent desorption in regeneration. The moisture presence in the fibre matrix seems to be improving the $CO_2$ adsorption and solubility in the matrix. Moisture adsorption with 4A zeolite fibres breakthrough times are greater than 2 hours. The internal layer of 13X and the intermediate layer of 4A both adsorb $CO_2$, however the kinetic adsorption of $CO_2$ onto 4A is slower and hence the curves for adsorption on 4A would be shallower and the capacity for $CO_2$ would be less. This shows that two or three types of adsorbents could be incorporated into the fibre structure either as a mixed matrix or as a layered system to adsorb selected components at different rates. It also shows the benefits of an open structure with open pore macrovoids proving more efficient for both adsorption and desorption.

FIG. 7 shows the electrical regeneration performance of the fibres (again, composition from example 1) and in particular the desorption of $CO_2$ from the adsorbent. In runs (a) and (b) the fibre was purged with a flow of nitrogen as the electrical current is applied. In both cases the current was 35V AC and for run (a) the purge was 200 ml/min of nitrogen and for run (b) the purge was 100 ml/min of nitrogen. In both cases it can be seen that the adsorbent is purged of substantially all of the adsorbed $CO_2$ within 10 minutes. For run (a) the desorption is marginally quicker with the higher concentration of nitrogen purge.

Double Layer Fibres

The fibres were prepared in similar ways to that set out above with a triple orifice spinnerette being used to produce the double layer fibre. The inner layer includes the active component, in this case 13X which is sensitive to the presence of CO2. The composition of the double layer fibre of this example is set out in table 3 below.

TABLE 3

| | double layer fibre | | |
|---|---|---|---|
| | Polymer/solvent wt (%) | Polymer/adsorbent wt (%) | Resistance in the external layer Ω/(25 cm × 100-300 Fibres) |
| Internal layer | PESF/NMP 20/80 | PESF/13X 22/78 | 120-30 |
| External layer | PESF + polyanille/ NMP 19.8 + 0.2/80 | PESF/activated charcoal + carbon black + copper 38/19 + 14.5 + 28.5 | |

FIG. 8 shows an SEM of the double layer fibre formed. The inner layer contains 13X as the active ingredient to primarily adsorb CO2 from a gas stream and the outer layer is the conducting layer to pass the current through the fibre and provide localised heating of the adsorbent in the inner layer and thereby to desorb the material.

FIGS. 9a and 9b show each of the layers at much higher magnification to show in more detail the structure of each layer. FIG. 9a shows the outer conducting layer which is dominated by the carbon. This again has a dense structure to enable the current to pass through the fibre but still has sufficient porosity to allow the gases to pass through to the active inner layer. FIG. 9b shows the inner layer which includes the 13X zeolite.

In one embodiment, a bundle of fibres such as those shown in FIG. 10a may be grouped together as shown, for example, in FIG. 10b. In this case, the end of the bundle of fibres may be capped with an electrically conductive cap with a conductor on the inside which contacts all of the fibres. This simplifies the electrical supply to the bundle of fibres by ensuring that it is not necessary to have separate supplies to each fibre but a single connection at each end of the overall bundle.

FIG. 11 shows the heating performance of a fibre under cyclic heating at 40V AC input current. The initial resistance in the fibre was 158Ω but this decreased down to a steady 118Ω after 6 heating cycles. All of the subsequent testing was done on fibres which had reached this steady state with a resistance of 118Ω. The graph also shows that the rate of heating up increased as the fibre reached steady state and once at this state the fibre rapidly increased temperature to 190° C. (without insulation) within 15 minutes and stayed at this level while the voltage remained on.

FIG. 12 shows the steady state heating and cooling performance of double layer fibres without the use of a purge during the regeneration step. Again it can be seen that the fibres rapidly heat to a temperature of 190° C. (within 20 minutes) and that this is maintained while the voltage is applied. The voltage is switched off at 120 minutes and it an be seen that the temperature drops away equally rapidly back down towards ambient temperatures. Much more rapid heating to 190° C. was observed with tripling the fibre numbers (within 5 minutes). The fibres are back at room temperature within 20 minutes of the voltage being stopped even without the use of a purge. With a purge the increase and decrease in temperature may be slightly quicker as the temperature gradient is maintained by the effective removal of desorbed gas.

FIG. 13 shows the adsorption performance of a number of fibres after they have already been regenerated and have reached the steady state. The regeneration took place at 190° C. as described above. For curve (a) the regeneration took place in the presence of a purge of 200 ml/min of nitrogen. For run (b) the regeneration took place with a lower purge of just 100 ml/min of nitrogen. For run (c) the regeneration took place in the absence of a nitrogen purge but under a low atmospheric vacuum.

FIG. 14 shows the desorption performance of the fibres under a nitrogen purge (200 ml for curve (a) and 100 ml for curve (b)) at 180° C. as generated by an applied voltage of 40V AC. While the use purges is known in existing techniques for regeneration, the quantity of nitrogen required is of the order of 10 times as much as may be used in the present invention. However, as indicated above the use of a nitrogen or other gas (e.g. air) purge is not essential in the present invention which works effectively with no purge.

Referring to FIGS. 13 and 14, it can be seen that adsorption of the carbon dioxide can be achieved rapidly with all fibres and they all provide a sharper breakthrough curve and much better kinetic adsorption performance than existing adsorbents. This results in reduced bed sizes and inventory. Electrical heating under a low vacuum (ETVS) gave an improved performance when compared to the fibres which had been regenerated with the nitrogen purge. The electrically desorbed $CO_2$ will be taken away by the small purge gas flow rate while the vacuum will assist in removing any trapped molecules within the structure. An improved adsorption capacity is therefore shown by reference to FIG. 14. This shows that complete desorption can be achieved within around 20 minutes by electrical heating at 190° C. with a nitrogen purge.

EXAMPLE 4

A double layer fibre made according to the composition set out in table 4 below was made. The fibre was heated to 200° C. and was then allowed to cool with different cooling patterns. (a) Fibre module was regenerated at 200° C. with 200 ml/$N_2$ purging. (b) Fibre module regenerated at 200° C. while vacuuming for 2 hrs without $N_2$ purging and then cooling for 1 hr. (c) Fibre module regenerated at 200° C. while vacuuming for 1 hrs without $N_2$ purging and then cooling for 4 hrs. (d) Fibre module was regenerated at 200° C. while vacuuming for 1 hrs without $N_2$ purging and then cooling for 1 hrs. (e) Fibre module was regenerated at 200° C. while vacuuming for 30 mins without $N_2$ purging and then cooling for 1 hrs. (f) Fibre module was regenerated 200° C. while vacuuming for 20 mins without $N_2$ purging and then cooling for 1 hrs.

TABLE 4

| | Polymer/solvent wt (%) | Polymer/adsorbent wt (%) | Resistance in the external layer Ω/(25 cm × 100-200 Fibres) |
|---|---|---|---|
| Internal layer | PESF/NMP 20/80 | PESF/13X 10/90 | 100-60 |
| External layer | PESF + polyanille/NMP 19.8 + 0.2/80 | PESF/activated charcoal + carbon black + copper 38/19 + 15 + 28 | |

FIG. 15 shows the adsorption performance of the double layer fibre and the different cycles of thermal and vacuum cycling. It is apparent that adsorbent fibre regeneration can be successfully achieved with vacuum while electrically heating at 200° C., for 20-30 minutes without any purge flow. Further, the adsorption performance of the fibre module after vacuum-thermal regeneration is similar to thermal regeneration with heated $N_2$ (for an extended period of time). The breakthrough time is similar even if heated at a slightly higher temperature (210° C.). There is also no substantial difference between 2 hours vacuum, 20 minutes vacuum or heating at 210° C. or 200° C.

EXAMPLES 5 TO 10

Double layer fibres were made in the same way as for example 4, but with the compositions for the external layer as set out in table 5 below. In each of examples 5 to 10 the internal layer is 20% PESF/80% 13X adsorbent by weight. FIG. 16 shows the temperature profile for these 6 examples for different applied voltages where the voltage ranging from 20V to 150V AC is applied for 2 minutes. In each case a bundle of 25 fibres is heated by application of the voltage.

TABLE 5

| | The various compositions of fibre conductive layer (external layer) | | | |
|---|---|---|---|---|
| Dope No | Polymer/solvent Wt (%) | Polymer/adsorbent Wt (%) | additives | resistance Ω/cm |
| Example 5 | PESF + polyaniline/NMP 15 + 0.5/84.5 | PESF/activated charcoal 27.9/72.1 | none | 80 |
| Example 6 | PESF/NMP 15.3/84.7 | PESF/activated charcoal | Polyaniline composite | 193 |

TABLE 5-continued

The various compositions of fibre conductive layer (external layer)

| Dope No | Polymer/solvent Wt (%) | Polymer/adsorbent Wt (%) | additives | resistance Ω/cm |
|---|---|---|---|---|
| Example 7 | PESF/NMP 15.3/84.7 | PESF/activated charcoal 33/67 | 20 wt % in carbon 2 g Polypyrrole composite 20 wt % in carbon 2 g | 196 |
| Example 8 | PESF + polyaniline/ NMP 19.8 + 0.2/80 | PESF/activated charcoal + carbon black 50/31.25 + 18.75 | none | 60 |
| Example 9 | PESF + polyaniline/ NMP 19.8 + 0.2/80 | PESF/activated charcoal + carbon black + 4A 35.3/20.6 + 14.7 + 29.4 | none | 90 |
| Example 10 | PESF + polyaniline/ NMP 19.8 + 0.2/80 | PESF/semi-conducting material 25/75 | none | 120 |

Referring to table 5 and FIG. 16, it can be seen that a range of properties are available by varying and controlling the resistance and conductivity properties of the fibre layer. This is largely determined by the selection of polymer/solvent and the presence or absence of an additive/conducting materials. The appropriate use of such additives and the thickness of the conducting layer can closely control the resistance and hence the voltage and the required regeneration temperature of the fibre.

For the multilayer fibres prepared using composition set out in an example 5 very high temperatures could be reached with a very short space of time, in excess of 300° C. in 2 minutes of heating at an applied voltage of about 108V AC. The conductivity of the hollow fibre prepared from (PESF+polyaniline) and activated charcoal with carbon black (Example 8) gives a lower resistance (60 ohm/cm) and good conductivity. It is possible to achieve regenerable temperatures using low voltages. When the voltage applied was up to 50 VAC the temperature of hollow fibre reached at 190° C. in 2 minutes.

The invention claimed is:

1. An adsorption unit comprising:
an adsorbent hollow fibre comprising a first layer containing a first active component and a second layer containing a means for transmitting heat, the first layer and the second layer being discrete layers.

2. An adsorption unit as claimed in claim 1, in which the hollow fibre further comprises a third layer containing a second active component, wherein the first active component primarily absorbs a first target adsorbate from a as stream and the second active component primarily adsorbs a second target adsorbate from the gas stream.

3. An adsorption unit as claimed in claim 1, in which the means for transmitting heat comprises an electrically conductive material.

4. An adsorption unit as claimed in claim 1, in which the means for transmitting heat comprises a thermally conductive material.

5. An adsorption unit as claimed in claim 1, in which the hollow fibre has a mean pore size in each of the layers of less than 1 μm.

6. An adsorption unit as claimed in claim 1, in which the hollow fibre is inorganic and comprises an inorganic powder, a binder, an adsorptive component or a reactive component and the means for transmitting heat.

7. An adsorption unit as claimed in claim 1, in which the hollow fibre has a mean resistance in each of the layers of less than 100 Ω/m.

8. An adsorption unit as claimed in claim 6, in which the inorganic powder is selected from the group consisting of ceramics, adsorbents and ion exchange resins.

9. An adsorption unit as claimed in claim 8, in which the ceramic is selected from the group consisting of aluminium oxide, bentonite, silica, hydroxyapatite or mixtures thereof.

10. An adsorption unit as claimed in claim 6, in which the binder is selected from the group consisting of lead bisilicate frit, fine standard borax frit, bentonite and Hyplas.

11. An adsorption unit as claimed in claim 6, in which the hollow fibre has a flexibility of greater than 5° bending angle from a mid point of the hollow fibre.

12. An adsorption unit as claimed in claim 6, in which the hollow fibre additionally comprises a component selected from the group consisting of fumed silica, magnesium oxide, high silica silicalite, zircon opaque, hydroxyapatite, high silica zeolite and silicalite, and combinations thereof.

13. An adsorption unit as claimed in claim 1, in which the hollow fibre is organic and comprises a polymer, an additive, an adsorbent material and the means for transmitting heat.

14. An adsorption unit as claimed in claim 13, in which the polymer is selected from the group consisting of polysulfone, polyvinylidenefluoride (PVDF)), polyethylene, polypropylene, poly(phenylene oxide), polyacrylonitrile, polymethylmethacrylate, poly(vinyl chloride), Poly ether sulfone (PESF), Cellulose acetate, Polyamide (aromatic), Polyimide, Poly(ether imide) and poly(vinyl alcohol), co-polymers of Polylactide (PLA) and Polyglycolide (PGA), Polycaprolactone (PCL) and Poly(ethylene terephathalate) (PET), and mixtures thereof.

15. An adsorption unit as claimed in claim 13, in which the adsorbent material is a zeolite, high silica zeolite, molecular sieve material, silica adsorbent, activated carbon powder or an ion exchange resin.

16. An adsorbtion unit as claimed in claim 15, in which the adsorbent material is selected from the group consisting of silicalite, ZSM5, MCM41, MCM48, 4A, 13X and zeolite.

17. An adsorption unit as claimed in claim 1, in which a surface area to volume ratio is greater than 1000 m²/m³.

18. An adsorption unit as claimed in claim 1, in which the hollow fibre is a double-layer fibre.

19. An adsorption unit as claimed in claim 1, in which the hollow fibre is a triple-layer fibre.

20. Au adsorption unit as claimed in claim 1, in which the hollow fibre is a quadruple layer fibre.

21. An adsorption unit as claimed in claim 1 which the first and second layers are of the same composition.

22. An adsorption unit as claimed in claim 1, in which the first and second layers are of different compositions.

23. An adsorption unit as claimed in claim 22, in which the different compositions have different functionality.

24. An adsorption unit as claimed in claim 1, in which the first layer containing the means for transmitting heat is an outer layer.

25. An adsorption unit as claimed in claim 24, in which the means for transmitting heat is electrical conductivity means.

26. An adsorption unit comprising:
   an adsorbent hollow fibre including an active component and means for transmitting heat; and
   wherein the hollow fibre has a mechanical load strength of greater than 200 g force at a crosshead speed of 1.0 mm/sec for a hollow fibre with an effective porosity ($\epsilon/q^2$) of 1000-3000.

27. An adsorptive porous layer comprising a plurality of adsorption units, each of the adsorption units comprising an adsorbent hollow fibre in which the hollow fibre includes an active component and means for transmitting heat, in which there are at least 50 hollow fibres, and in which a surface area per unit volume is greater than 80 m²/m³.

28. An adsorptive porous layer as claimed in claim 27, in which a membrane may be used for liquid or gas separation.

* * * * *